United States Patent [19]

Slattery, Jr. et al.

[11] Patent Number: 4,825,712

[45] Date of Patent: May 2, 1989

[54] GEAR DAMPING SYSTEM

[75] Inventors: Duard G. Slattery, Jr., Mountain View, Calif.; Stanley S. Sattinger, Pittsburgh, Pa.; Richard G. DeJong, Belmont, Mass.

[73] Assignee: Westinghouse Electric Corp., Pittsburgh, Pa.

[21] Appl. No.: 632,972

[22] Filed: Jul. 20, 1984

[51] Int. Cl.$^4$ ............................................ F16H 55/14
[52] U.S. Cl. .............................................. 74/443; 74/574
[58] Field of Search ................ 74/443, 574; 188/378; 464/180

[56] References Cited

U.S. PATENT DOCUMENTS

| | | | |
|---|---|---|---|
| 643,134 | 2/1900 | Hogeland | 74/443 |
| 3,126,760 | 3/1964 | Peirce | 74/443 |
| 3,993,356 | 11/1976 | Groff et al. | 74/443 |
| 4,183,572 | 1/1980 | Albrecht et al. | 74/443 |

FOREIGN PATENT DOCUMENTS 172233  8/1952  Austria .................. 74/443

*Primary Examiner*—Deborah L. Kyle
*Assistant Examiner*—Richard W. Wendtland
*Attorney, Agent, or Firm*—Fred J. Baehr, Jr.

[57] ABSTRACT

A damping system for a fabricated gear comprising a plurality of viscoelastic sheets sandwiched between damping plates and side plates, the side plates having circumferential rings which act as mode converters to change in-plane vibration to bending mode vibrations and are fixed to one margin of the damping plate to provide effective vibration damping within the gear.

9 Claims, 1 Drawing Sheet

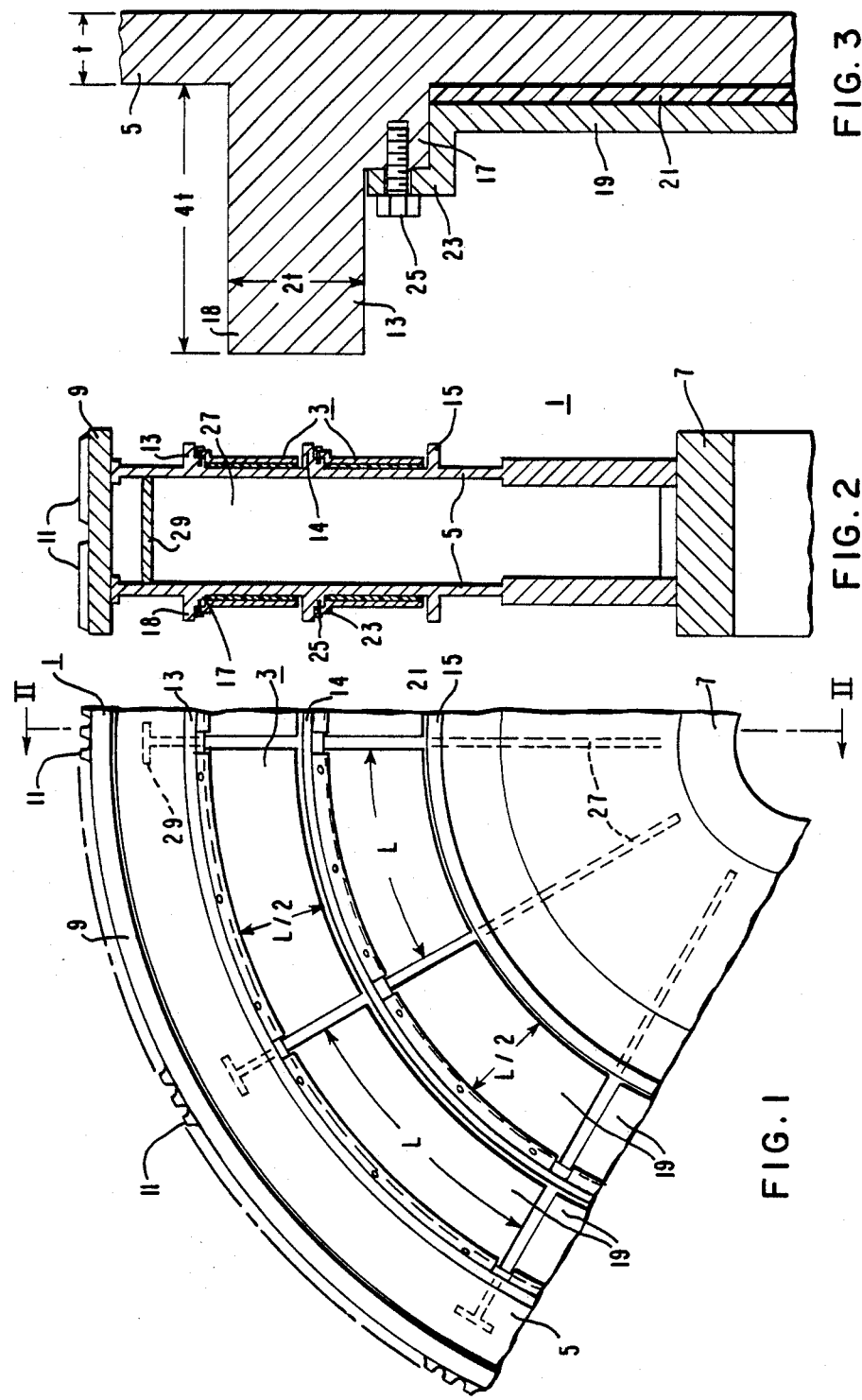

GEAR DAMPING SYSTEM

GOVERNMENT CONTRACT

The United States Government has rights in this invention pursuant to Contract No. N00024-83-C-4181 between Westinghouse Electric Corporation and the Department of Defense.

BACKGROUND OF THE INVENTION

This invention relates to large fabricated gears and more particularly to a vibration damping system for such gears.

In conventional gears, vibratory energy is conducted away in many vibratory modes in structures connected to the gears and eventually becomes noise. However, vibration isolation features such as side plate thickness steps, compliant mountings and compliant bearings reflect vibratory energy back into the gear. The damping in conventional gears is low and vibration energy builds up in the gear until the energy is sufficiently high to be transmitted across the vibration isolation devices and produces noise in supporting structures. In order to reduce the vibration transmitted, a damping system within the gear is required.

SUMMARY OF THE INVENTION

In general, a damping systems for a gear having a rim with a plurality of teeth disposed thereon, a hub, and means for connecting the hub to the rim, when made in accordance with this invention, comprises a mode conversion means attached to the connecting means a viscoelastic sheet bonded to the to the connecting means, a metal plate bonded to the viscoelastic sheet and means for fastening the metal plate to the mode conversion means, whereby vibration produced by the gear is damped.

BRIEF DESCRIPTION OF THE DRAWINGS

The objects and advantages of this invention will become more apparent from reading the following detailed description in conjunction with the accompanying drawings, in which:

FIG. 1 is a partial elevational view of a self-damping gear made in accordance with this invention;

FIG. 2 is a partial sectional view taken on line II—II of FIG. 1; and

FIG. 3 is an enlarged partial sectional view of the vibration damping system attached to a side plate.

DESCRIPTION OF THE PREFERRED EMBODIMENT

Referring now to the drawings in detail, there is shown a gear 1 having a damping system 3 disposed on the gear's side plates 5. The gear 1 comprises a hub 7 and a rim 9 having a plurality of teeth 11 disposed thereon. Connecting the hub 7 and the rim 9 are generally parallel side plates 5 or discs. While side plates 5 are used in the preferred embodiment, it is understood that arms or other connecting means could be utilized to connect the rim 9 to the hub 7. The side plates 5 are thicker adjacent the hub 7. The damping system 3 comprises a plurality of circumferential mode conversion means or ring's 13, 14 and 15 extending axially outwardly from the outer surface of the side plates 5 and are rigidly attached thereto. The radially outer mode conversion rings 13 and 14 have two steps 17 and 18 which ascend in a radially outward direction. The mode conversion rings 13, 14 and 15 generally have a dimension of 4T×2T where T is the thickness of the side plates 5 and operate to convert in-plane vibrations to bending mode vibrations to increase the effectiveness of the damping system 3 hence the name mode conversion rings.

In the annular space between adjacent mode conversion rings there are disposed annular arrays of damping plates 19. Sandwiched between the damping plates 19 and the side plates 5 are sheets 21 of viscoelastic material such as urethane or SOUNDCOAT DYAD 606,. The viscoelastic sheets 21 are adhesively attached to the outer surface of the side plates 5 and also are adhesively attached to the damping plates 19. The viscoelastic sheets 21 are made coextensive with the major portion of the damping plates 19 as the damping plates 19 have a step 23 which fits over the lower step 17 of the mode conversion rings 13 and 14 and are rigidly fastened thereto by cap screws 25 or other fastening means. The cap screws 25 and steps 17 and 23 fix one edge or margin of the damping plates 19 to the side plates 5 and the other three edges or margins of the damping plates 19 are free. The damping plates 19 generally have a circumferential length to radial width ratio of approximately 2:1 and are generally segments of an annulus. In the embodiment shown in FIGS. 1 and 2, there are two circular arrays of damping plates which cover approximately 50% of the outer surfaces of the side plates 5.

Disposed between the side plates 5 are a plurality of radially extending webs or struts 27 which are welded to the side plates, but do not extend to the hub 7 or rim 9. A flat bar 29 is disposed on the radially outer margin of the webs 27 and is generally disposed perpendicular thereto.

The damping system 3 hereinbefore described provides generally optimum size damping plates 19, which are restrained against centrifugal forces by the circumferential mode conversion rings 13 and 14 and not by the fasteners 25 and the circumferential mode conversion rings 13 and 14 also prevent viscous flow of the viscoelastic material. The damping plates 19 are restrained against shock in all directions.

What is claimed is:

1. A damping system for a gear comprising a rim with a plurality of teeth disposed thereon, a hub, and means for connecting said hub to said rim, said damping system comprising:
   a mode conversion means attached to said connecting means for converting in-plane mode vibrations in said connecting means to bending mode vibrations;
   a viscoelastic sheet bonded to said connecting means;
   a damping plate bonded to said viscoelastic sheet; and
   means for fastening said damping plate to said mode conversion means, whereby vibration produced by the gear are effectively damped.

2. A damping system as set forth in claim 1 and further comprising a step disposed on the mode conversion means generally extending circumferentially thereon and wherein the dampening plate has a step which fits over the step on the mode conversion means and the fastening means fastens the steps together.

3. A damping system as set forth in claim 2, wherein the damping plates have a width generally equal to one-half of their length.

4. A damping system as set forth in claim 1, wherein the mode conversion means is a ring and a plurality of damping plates are disposed in a circular array adjacent the mode conversion ring.

5. A damping system as set forth in claim 4, wherein a plurality of mode conversion rings and damping plates are disposed in circular arrays on the connecting means.

6. A damping system as set forth in claim 5, wherein each mode conversion ring has fasten thereto a plurality of damping plates disposed in a circular array.

7. A damping system as set forth in claim 6, wherein the connecting means comprises a disc extending from the hub to the rim.

8. A damping system as set forth in claim 6, wherein the connecting means comprises a pair of disc extending from the hub to the rim.

9. A damping system as set forth in claim 1, wherein the connecting means comprises a pair of discs extending between the hub and rim.

* * * * *